(12) United States Patent
Bryan et al.

(10) Patent No.: US 7,494,255 B2
(45) Date of Patent: Feb. 24, 2009

(54) CEILING ILLUMINATION FOR AIRCRAFT INTERIORS

(75) Inventors: Eric A. Bryan, Everett, WA (US); Randolph C. Camp, III, Renton, WA (US); Richard Fraker, Edmonds, WA (US); Kevin W. Shimasaki, Woodinville, WA (US); Miles A. Webb, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/553,725

(22) Filed: Oct. 27, 2006

(65) Prior Publication Data

US 2007/0109802 A1 May 17, 2007

Related U.S. Application Data

(63) Continuation of application No. 11/164,267, filed on Nov. 16, 2005, now abandoned.

(51) Int. Cl.
*B64D 47/02* (2006.01)
*B64F 1/20* (2006.01)
*B60Q 1/00* (2006.01)
*B60Q 3/00* (2006.01)
*F21V 7/00* (2006.01)

(52) U.S. Cl. .................. 362/471; 362/472; 362/490; 362/470; 362/516; 362/479

(58) Field of Classification Search ......... 362/470–472, 362/479, 484, 490, 493, 516
See application file for complete search history.

(56) References Cited

U.S. PATENT DOCUMENTS

| 3,358,134 | A | | 12/1967 | Gonyea | |
|---|---|---|---|---|---|
| 4,313,208 | A | * | 1/1982 | Kavenik | 455/42 |
| 5,108,048 | A | * | 4/1992 | Chang | 244/118.1 |
| 5,129,597 | A | * | 7/1992 | Manthey et al. | 244/118.5 |
| 5,395,074 | A | * | 3/1995 | Hart et al. | 244/118.1 |
| 5,921,670 | A | * | 7/1999 | Schumacher et al. | 362/480 |
| 6,871,981 | B2 | * | 3/2005 | Alexanderson et al. | 362/294 |
| 2005/0002198 | A1 | * | 1/2005 | Blechschmidt | 362/470 |
| 2006/0006821 | A1 | * | 1/2006 | Singer et al. | 315/312 |
| 2007/0053188 | A1 | * | 3/2007 | New et al. | 362/276 |
| 2008/0001557 | A1 | * | 1/2008 | Dardis et al. | 315/324 |

* cited by examiner

*Primary Examiner*—Jong-Suk (James) Lee
*Assistant Examiner*—David J Makiya
(74) *Attorney, Agent, or Firm*—Ostrager Chong Flaherty & Broitman P.C.

(57) ABSTRACT

Interior lighting and illumination systems for aircraft, particularly commercial passenger airplanes. Opposing pairs of LED lamps are positioned in the ceiling panels above the aisles between sets of seats in the passenger cabins. One set of LED lights are directed to illuminate the ceiling panels and may be in a particular color. The other set of LED lights are positioned to shine their lights on storage/stowage bins positioned across the aisles, thus creating a cross-bin lighting system. This enhances the cabin architecture and provides cabin illumination. A reflector can be positioned to direct the light and reduce possible glare to the passengers. The reflector directs the light rays from the LED lights which emanate from the top of the reflector to shine on the lowest part of the bins. The light rays leaving the reflector cross in front of the reflector.

14 Claims, 4 Drawing Sheets

CEILING ILLUMINATION FOR AIRCRAFT INTERIORS

CROSS-REFERENCE TO RELATED APPLICATION

The present application is a continuation of U.S. application Ser. No. 11/164,267, which was filed Nov. 16, 2005 now abandoned, entitled "CEILING ILLUMINATION FOR AIRCRAFT INTERIORS."

TECHNICAL FIELD

The present invention relates to interior illumination systems for aircraft, particularly interior illumination and lighting systems for the passenger cabins in commercial passenger airplanes.

BACKGROUND OF THE INVENTION

The interior configuration, architecture, and illumination of airplanes has become relatively standardized today. The arrangement of passenger seats, passenger cabins, bulkheads, lavatories, serving areas, and the like have become developed for convenience and accommodation of both passengers and crew. The passenger compartments have sidewall members with a plurality of windows, a floor member and a ceiling member or assembly of some type. In addition, pluralities of rows of stowage or storage bins are positioned on the aircraft generally at the position between the sidewalls and the ceilings. For larger twin-aisle aircraft, rows of inboard stowage bins are also positioned over the seats positioned along the center of the passenger cabins.

In general, the space in the passenger cabins in airplanes is limited and can be called claustrophobic at times. In this regard, the design, architecture, and lighting of the interiors of passenger aircraft, particularly the passenger cabins, have remained typically constant for a long period of time and have not had a significant variety of changes or updates as common in many industries.

There is a need in the aircraft industry for new and innovative solutions to passenger space, cabins, furnishings and illumination. There is also a need to change or vary the aesthetics of passenger cabins in order to improve the perception and aesthetics of the space, as well as possibly catering to the different moods of the passengers and changings of the events dramatizing the key rituals performed aboard an aircraft, such as boarding, resting, eating and the like.

SUMMARY OF THE INVENTION

It is thus an object of the present invention to provide products and systems which improve the configuration, architecture, illumination and aesthetics of passenger cabins for airplanes. It is also an object of the present invention to provide products and systems which improve the perception and aesthetics of the passenger space and provide a more pleasing atmosphere and situation for the passengers.

These and other objects and purposes of the present invention are met by the present invention. In accordance with the present invention, the illumination systems and lighting in the passenger cabins are improved. In the ceiling structures between the outboard storage bins and inboard storage bins in twin-aisle aircraft, and between the two sets of outboard storage bins in single-aisle aircraft, lighting fixtures are provided which provide color and illumination in a significantly different manner than with present airliners and passenger cabins. The lighting fixtures are preferably LED lighting fixtures and two sets are provided on either side of the ceiling structures adjacent and above the storage/stowage bins. One set of lights direct their illumination toward the ceiling structure and provide uniform illumination of the ceiling structure. In this regard, the illumination can have a certain color or have the color change depending on the ritual or situation in the passenger cabin.

A second sets of lights on each side of the ceiling structures direct their illumination across the ceiling space to the opposite sets of storage/stowage bins. The illumination from these lights is directed across and under the ceiling to illuminate the storage/stowage bins (or monument or surface) located opposite from the light fixture. Preferably, the light from these second sets of lights is white light or nature light color. Together, the illumination from the two sets and two pairs of lights provides a soft or infinity appearance to the ceiling while allowing the rest of the passenger cabin to be lighted naturally.

The two sets or arrays of LED lights on either side of the ceiling structures can be positioned in various configurations, such as by being stacked one on top of the other, positioned individually side-by-side, or positioned in groups side by side.

With the present invention, the passenger cabin can have dynamic lighting or mood lighting, or can change depending on the situation aboard the aircraft at the time, such as boarding, resting, eating, or the like. Also, providing colored light illumination across the ceiling structure does not also illuminate objects in the passenger compartment, such as passengers and their clothing, with that same color.

In a preferred embodiment of the invention, a deflector is utilized relative to the light sources on the two sides or edges of the ceiling structures. The reflectors direct the light across the ceiling spaces to the specific areas desired and reduce the tendency of the light to shine past the bins or monuments and create glare for the passengers. One deflector embodiment has the general shape of a conic section.

Also, with a preferred reflector embodiment, the light rays directed to the lowest part of the opposite storage/stowage bins are illuminated from light emanated from the top of the reflector. Thus the light rays leaving the reflector cross in front of the reflector. In particular, the light reflector controls the light from a near-point source in such a way to direct it onto the face of the storage/stowage bins while preventing light from shining under the bins. The crossing of the light waves in front of the reflector insures that none of the reflector is visible to the passengers.

Further details, benefits and features of the present invention will become apparent from the following description when taken in connection with the accompanying drawings and appended claims.

DESCRIPTION OF PREFERRED EMBODIMENTS

The passenger compartments of commercial airlines today have become relatively standardized and have not had a significant amount of innovation. The space itself in passenger cabins is quite limited due to the external size and configuration of the airplane itself and thus any changes are necessarily limited to begin with. However, with the present invention, the interest, ambience, and aeronautic quality of the space is enhanced and increased significantly. With the present invention, the illumination and lighting systems have been improved to change the passenger's perception of the passenger cabin, particularly the height and aesthetics of the ceiling.

In addition, different lighting techniques and the color of the lights can be changed in accordance with the present invention in order to cater to different moods of the passengers and also to change the "look and feel" of the passenger cabin during some of the key operations of the passenger airline experience, such as boarding, resting, eating, and the like.

Figure 1:
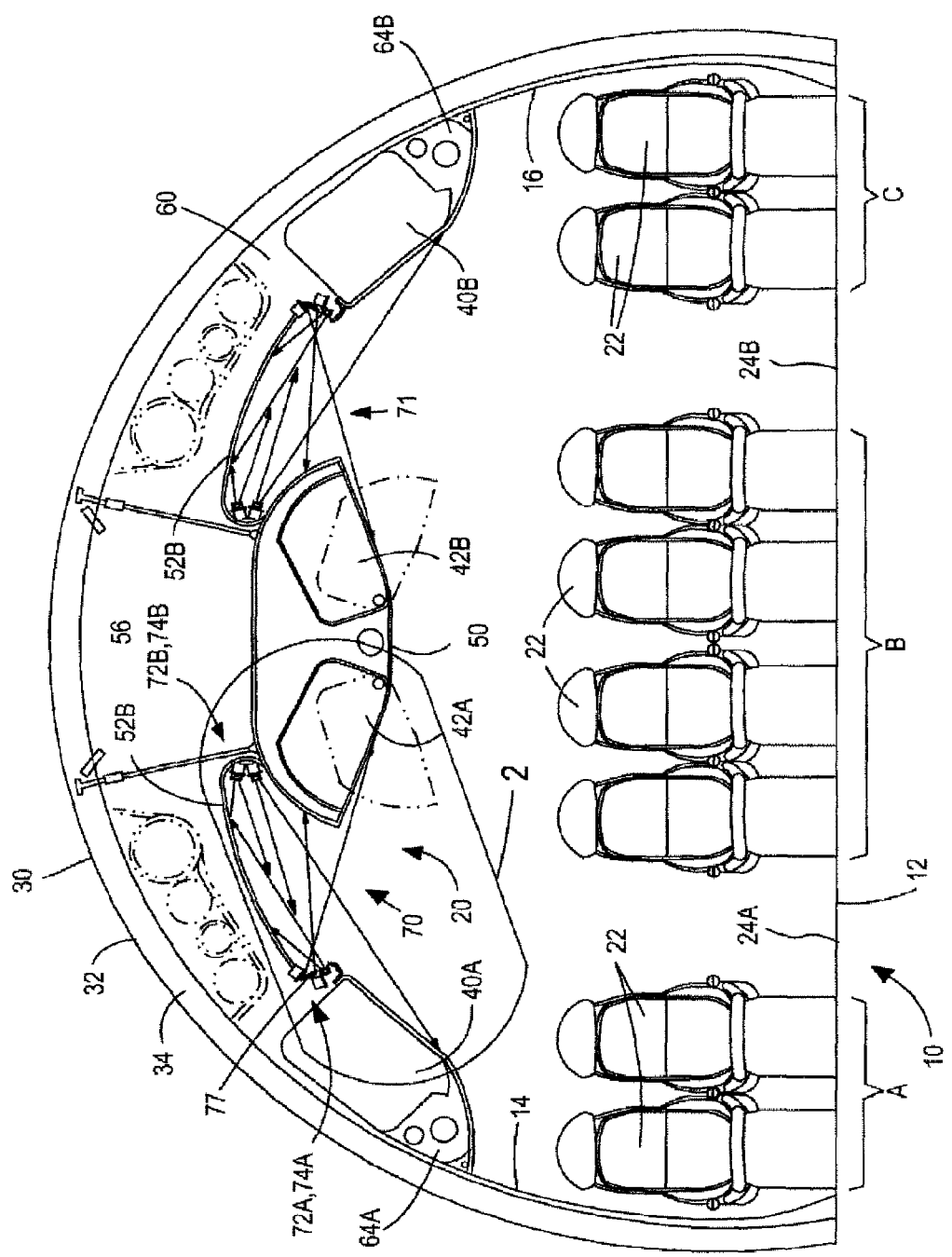
FIG. 1 is a cross section of an aircraft passenger cabin in accordance with one embodiment of the present invention.

In FIG. 1, the passenger cabin itself is designated by the reference numeral 10. The passenger cabin has a floor panel 12, a pair of sidewall members or panels 14 and 16, a ceiling panel or structure generally referred to by the reference numeral 20, and a plurality of passenger seats 22. As is common with larger commercial passenger airliners today, the passenger seats in each row are arranged in three sets, A, B, and C, with two aisles 24A and 24B.

The exterior of the airplane fuselage is designated by the reference numeral 30. As is typical and conventional with aircraft, an exterior skin 32 is provided which is attached to circular or semi-circular bulkhead members 34. The bulkhead members provide support and stability for the fuselage of the aircraft.

The passenger cabin 20 has a plurality of rows of outboard storage or stowage bins 40A, 40B which are provided generally at the intersection of the sidewall members 14, 16 and the ceiling structure 20. Since the airplane shown in FIG. 1 has a twin-aisle passenger cabin, rows of inboard storage bins 42A and 42B are provided over the central rows of passenger seats B. The storage/stowage bins 40A, 40B, 42A, 42B are hinged relative to the passenger cabin such that they rotate from an up or closed position to a down or open position as shown in dashed lines in FIG. 1. The storage/stowage bins are used for storing luggage, packages, and other personal items of the passengers during flight.

In accordance with the use of the present invention in the passenger cabin shown in FIG. 1, the ceiling system of the aircraft has a central structure 50 in which the two inboard storage/stowage bins 42A, 42B are positioned. The central ceiling structure 50 is suspended and held in place by strut members 56. A pair of ceiling structures 52A and 52B are positioned between the central ceiling structure 50 and the two rows of outboard storage/stowage bins 40A and 40B.

The crown space 60 between the ceiling structures 52A, 52B and the exterior of the fuselage 30 is typically utilized for support lines and conduits for accessory and auxiliary systems of the aircraft. These include conditioned air, water, hydraulic systems and electrical systems, although some of these systems can be positioned in the lower bay of the airplane rather than the crown of the aircraft.

The structures positioned between the storage bins 40A, 40B and the passenger seats 22 on the outboard portions of the airplane are designated by reference numeral 64A and 64B. These are typically passenger service unit modules (PSUs) and include some of the passenger service systems, such as individual seat lighting, air nozzles and safety masks which are triggered to drop into the passengers control upon certain emergency situations, all as typically known with aircraft and passenger airplanes to date.

Figure 2:
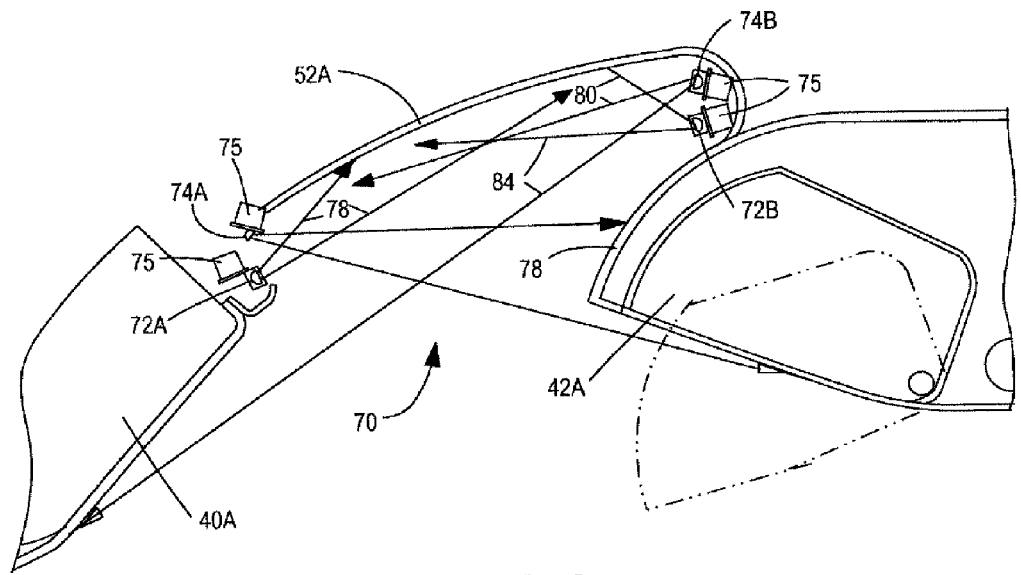
FIG. 2 is an enlarged view of a representative portion of the ceiling structure of the aircraft passenger cabin as shown in FIG. 1.

As shown in FIG. 1 and also in the enlarged view in FIG. 2, a preferred embodiment of the lighting and illumination system in accordance with the present invention is shown and indicated generally by the reference numeral 70. In this regard, although the description will concentrate primarily and discuss in detail relative to the system 70 shown in the lefthand portion of FIG. 1, it is understood that the ceiling illumination system as described is representative of the other ceiling illumination systems in the airplane, such as system 71.

As shown in FIG. 1 and more particularly in FIG. 2, the illumination system embodiment 70 includes a ceiling panel member 52A, two pairs of lighting fixtures 72A, 72B, 74A and 74B, as well as structural wall surfaces 76 and 78 on the outboard and inboard surfaces of the stowage/storage bins, respectively. In this regard, the structure and configuration of the ceiling panel 52A, together with the wall panel members 76 and 78 position the lighting fixtures 72A, 72B, 74A, 74B at positions such that they cannot be viewed by the passengers in the passenger cabin.

The lighting fixtures 72A, 72B are preferably RGB LED lights and are directed to focus their illumination on the ceiling panel 52A. This is indicated by the arrows 78 and 80 in FIG. 2. The lighting fixtures 74A, 74B are preferably white LED lights or RGBW LED lights of a certain beam width and angle that directs the light across and under the ceiling 52A to illuminate the stowage/storage bins and surfaces located opposite from the lighting fixtures. This is indicated by the arrows 82 and 84 in FIG. 2. Heat sink members 75 are provided adjacent the lighting fixtures in order to prevent the fixtures from overheating and thereby reducing the life of the lights.

With the present invention, the surface of the ceiling member 52A can be illuminated in any color, such as blue emulating the sky, while the rest of the area below is illuminated in white light or natural light color. This provides an appearance a higher ceiling to the passengers, and also provides a soft infinity aspect to the ceiling. At the same time, the invention allows the rest of the passenger space in the cabin to be lighted naturally. The white light from the light fixture 74A, 74B prevents the illumination from the lighting fixture 72A and 72B if they are in color from affecting the color of the passengers' skins, passenger seats, or belongings in the passenger cabin 10.

The pairs of lighting fixtures 72A and 74A on the one hand and 72B and 74B on the other provide the uniform illumination of the ceiling without areas of significantly different intensities. The pairs of lighting fixtures also allow illumination in the passenger cabin below the ceiling panels in a more uniform and pleasant manner. The cross-beam lighting system, as shown in FIGS. 1 and 2, provide these advantages.

Figure 2A:
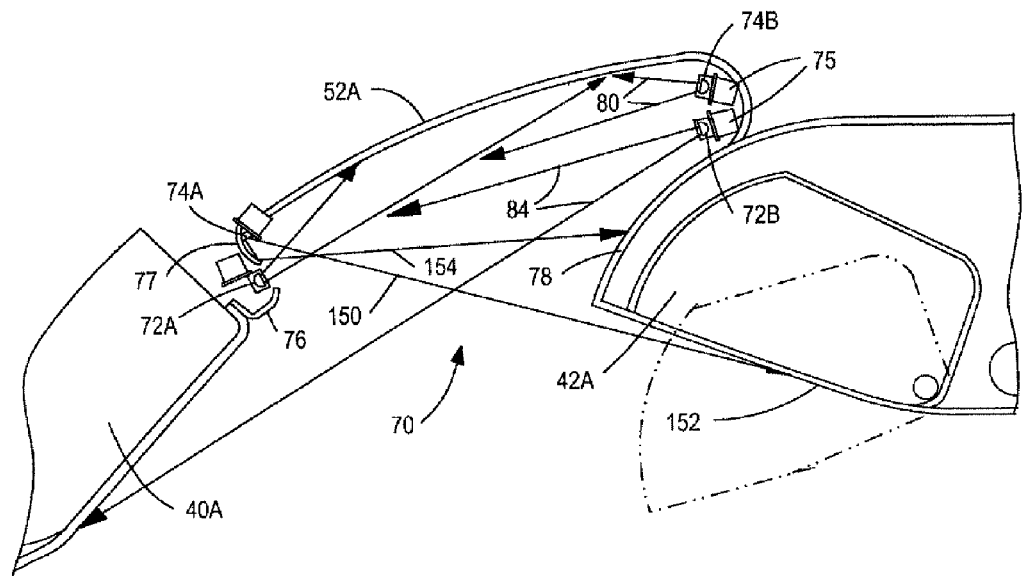
FIG. 2A is an alternate embodiment of the ceiling illumination system as shown in FIGS. 1 and 2.

Although it is shown in FIGS. 1 and 2 that the lighting fixture 72B is positioned vertically above lighting fixture 74B, it is also possible to switch those two positions. This is shown in FIG. 2A. It is further possible to have lighting fixtures 72A and 74A be in either location, one positioned above or below the other.

Figure 3:
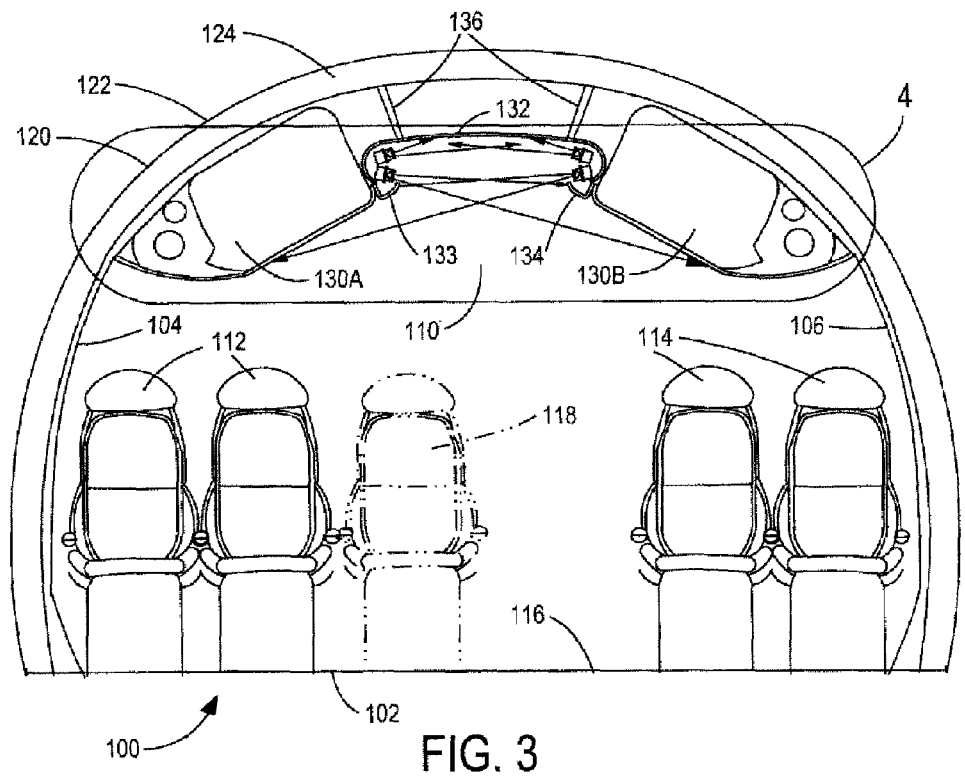
FIG. 3 is a cross section of an aircraft passenger cabin in accordance with another embodiment of the present invention.
Figure 4:
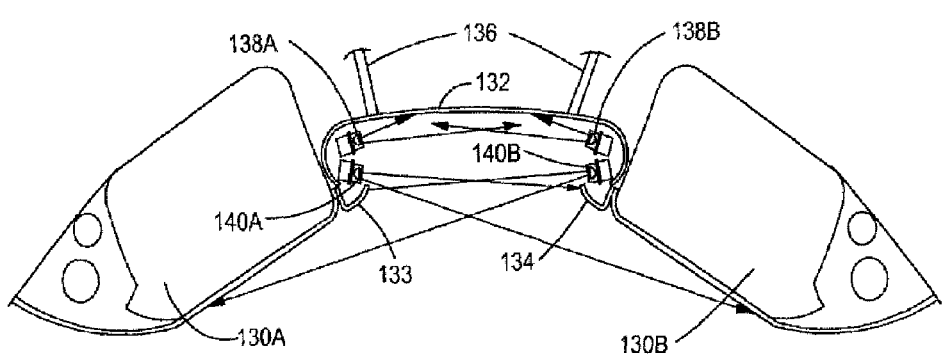
FIG. 4 is an enlarged view of a representative portion of the ceiling structure of the aircraft passenger cabin as shown in FIG. 3.

The present invention has applicability in smaller single-aisle airplanes, as well as in larger twin-aisle airplanes. For example, as shown in FIGS. 3 and 4, the lighting product and illumination system of the present invention can be used with a single-aisle passenger cabin 100. The passenger cabin 100 has a floor panel 102, a pair of sidewall members or panels 104 and 106, a ceiling structure generally referred to by the reference numeral 110, and a plurality of passenger seats 112 and 114. As shown in FIG. 3, the passenger seats are arranged in two sets or pairs of two seats each with a single aisle 116. It is also possible with different sizes of airplanes, that one set of passenger seats 112, 114 can alternatively be a three-seat arrangement, with the third seat being shown in dashed lines 118 in FIG. 3.

The exterior of the airplane fuselage is designated by the reference numeral 120. As is typical and conventional with aircraft, on exterior skin 122 is provided which is attached to circular or semi-circular bulkhead members 124. The bulkhead members provide support and stability for the fuselage of the aircraft.

The passenger cabin 100 has a plurality of rows of outboard storage/stowage bins 130A and 130B. The bins are positioned generally at the intersection of the sidewall members and the ceiling structure. Storage bins 130A, 130B are hinged relative to the passenger cabin such that they rotate from an up or closed position to a down or open position for loading and unloading of the luggage, packages and other personal items of the passengers.

In accordance with the present invention, the ceiling structure for a single aisle aircraft has a curved arch-type center structure 132 as shown in FIG. 3. The curved configuration starts at the intersections with the wall members 133 and 134 which are positioned immediately adjacent the outboard storage bins 130A and 130B. The curved ceiling structure 132 is similar to that shown in FIG. 2 and referred to by the reference number 52A. The central ceiling panel structure 132 can be attached to the airplane fuselage structure by strut or support members 136 which are connected to the bulkhead of the fuselage similar to struts 56 shown in FIG. 1. Of course, it is also understood that the central ceiling structure 132 can be attached or suspended to an aircraft in any other conventional manner known to persons of ordinary skill in the art.

The ceiling system 110 has a pair of LED lighting fixtures on either side of the ceiling panel which are positioned to operate in a manner similar to LED lighting fixtures 72A, 72B, 74A and 74B as described above. The LED lighting fixtures 138A, 138B shine their light to illuminate the inner surface of the ceiling panel member 132 while the illumination from the LED lighting fixtures 140A, 140B are utilized to illuminate the surfaces of the stowage/storage bins 130B and 130A, respectively.

In one preferred embodiment of the invention, a unique reflector member and system are utilized to help focus and direct the light rays from the LED lighting fixtures onto the opposite bins and adjacent surfaces. A reflector member 77 of this type is shown in FIGS. 1 and 2A. The reflector 77 helps direct the light from the LED lighting fixture 74A and reduces the light shining passing below the bins which might create glare to the passengers. The reflector 77 preferably has the shape of a conic section, but can be any other shape which performs the same purpose and produces the same result. The reflector member 77 is hidden from view behind the wall members 76, but could also be hidden from view by other light valances or architectural features.

As indicated above, the reflector members 77 direct the light rays in a certain manner. Light rays 150 that shine on the lowest part 152 of the opposite bin faces emanate from the top of the reflector members 77. This causes the light rays 150 and 154 leaving the reflector members 77 to cross in front of the reflector.

The reflector member design, together with the cross-bin lighting system, has the effect of creating mystery to the passengers as to the source of the illumination and how the stowage/storage bins are illuminated. This adds to the drama of the interior architecture.

As is well known, it is preferred to illuminate the faces of the storage bins and make them visible to passengers in the cabin. Unless the beams of light are carefully controlled, however, the light sources may create glare for the passengers and create an unsightly area of light on the opposing sidewalls. Manufacturing tolerances, vibration, and movement of the bins during flight can exasperate this matter.

The light reflector members 77 in accordance with the present invention control the light from a near-point source, that is the LED lighting fixtures in order to direct it onto the face of the opposite storage/stowage bins while preventing light from shining under the bins. By crossing the light rays in front of the reflector members, no part of the reflector members are visible to the passengers.

The reflector members 77 can be made of any material, but preferably are made from a molded plastic material or other lightweight material.

With the cross-bin lighting system of the present invention, the light beams typically taper off gradually at the bottom of the storage/stowage bins. In order to insure that the edges of the beam do not create a visible sharp line on the bin surfaces, the reflector shape is altered or certain imperfections are intentionally introduced into the edge of the reflector or its surface reflector in order to control the tapering of the beam. These imperfections can be grooves or texturing (not shown) on the edge of the reflector or on its surface.

The present invention allows better directional control of the light beams within the passenger cabin, and the alternate use of colored light produces effects within the cabin which are pleasing to the passengers and also create the impression of space and height.

Figure 5:
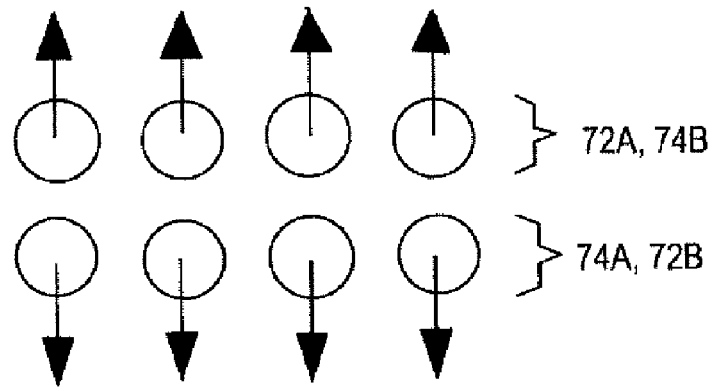
FIGS. 5-7 illustrate alternate embodiments of illumination sources which can be used with the present invention.
Figure 6:
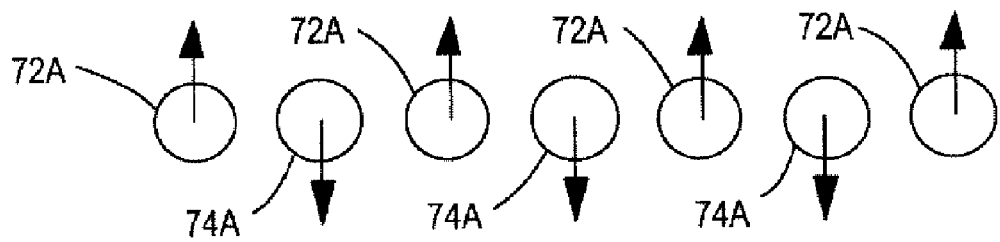

As indicated above, the two LED lighting systems, such as 72A and 74A on the one hand and 72B and 74B on the other hand in FIGS. 1 and 2 are positioned in a stacked configuration, i.e., one on top of the other. From a side view, this configuration is shown in FIG. 5. It is also possible, however, to provide the two LED lighting fixtures in different positions. For example, as shown in FIG. 6, the LED lighting fixtures 72A, 723B, 74A and 74B are positioned next to each other in longitudinal orientation, with one LED light shining up toward the surface of the ceiling structure while the LED lights on opposite sides provide a natural light in a cross-beam manner on the opposing stowage/storage bins.

Figure 7:
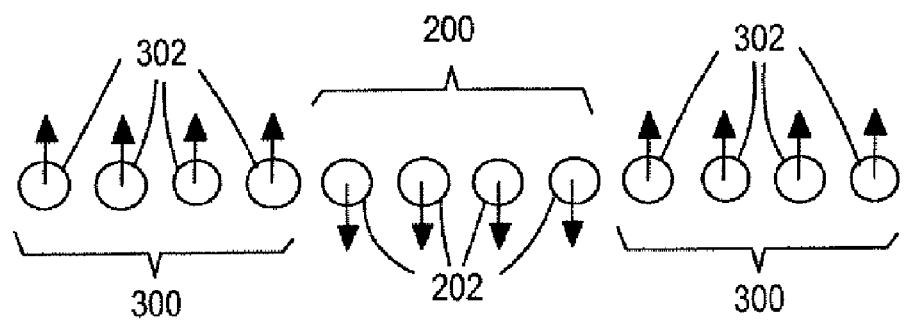

Also, as shown in FIG. 7, the LED lighting fixtures can be positioned in groups or arrays adjacent each other along a common longitudinal axis. For example, a group or array 200 of LED lamps 202 is positioned and shines their lights in a cross-beam manner onto the opposite storage/stowage bins, while LED lights 302 positioned in array 300 are in an adjacent position and are aimed to direct their illumination toward the ceiling structure above the aisles of the airplane.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. An illumination system for cross-bin illumination of a ceiling structure of an airplane the cross-bin illumination system comprising: a first row of stowage bins and a second row of stowage bins adjacent a ceiling structure of an airplane and opposite the first row of stowage bins, said first and second rows of stowage bins positioned generally at the intersection of an aircraft sidewall and ceiling structure; a first illumination source adjacent said first row of stowage bins and a second illumination source adjacent said second row of stowage bins and further comprising a reflector member positioned adjacent said first illumination source, said reflector member adapted to control the light from a near-point source to prevent light shining under the bins, direct light toward said second row of stowage bins, reduce glare and insure the reflector is not visible to passengers; said first illumination source comprising a first light fixture for directing light toward said ceiling structure and a second lighting fixture for directing light toward said second row of stowage bins wherein said first lighting fixture is positioned adjacent and above said second lighting fixture; and said second illumination source comprising a third lighting fixture for directing light toward said ceiling structure and a fourth lighting fixture for directing light toward said first row of stowage bins, wherein said third lighting fixture is positioned above said fourth light fixture, and wherein said first lighting fixture and said third lighting fixture direct colored light toward the ceiling structure and the second and fourth lighting fixture direct natural color or white light toward the second and first rows of stowage bins, respectively.

2. The illumination system as described in claim 1 wherein said ceiling structure has a curved configuration.

3. The illumination system as described in claim 1 wherein said colored light is a blue color.

4. The illumination system as described in claim 1 wherein said first, second, third and fourth lighting fixtures comprise LED lights.

5. The illumination system as described in claim 4 wherein at least said first and third lighting fixtures comprise RGB LED lights.

6. The illumination system as described in claim 4 wherein at least said second and fourth lighting fixtures comprise RGBW LED lights.

7. The illumination system as described in claim 1 wherein said first and second lighting fixtures are positioned adjacent one another in longitudinal alignment.

8. The illumination system as described in claim 7 wherein said first lighting fixture comprises a first plurality of LED lights and said second lighting fixture comprises a second plurality of LED lights.

9. The illumination system as described in claim 1 wherein said airplane is a twin aisle airplane and two ceiling structures are provided, each of said ceiling structures having adjacent rows of stowage bins and illumination sources as set forth in claim 1.

10. The illumination system as described in claim 1 wherein said reflector member has the shape of a conic section.

11. The illumination system as described in claim 1 wherein said reflector member has grooves or texturing thereon, wherein the tapering off of the light directed to the stowage bins is gradual.

12. An illumination system for cross-bin illumination of the ceiling structure of an airplane having a first row of stowage bins and a second row of stowage bins adjacent said ceiling structure, said cross-bin illumination system comprising: a first row of stowage bins and a second row of stowage bins adjacent a ceiling structure of an airplane and opposite the first row of stowage bins, said first and second rows of stowage bins positioned generally at the intersection of an aircraft sidewall and ceiling structure; a first illumination source adjacent said first row of stowage bins and a second illumination source adjacent said second row of stowage bins; said first illumination source comprising a first lighting fixture for directing light toward said ceiling structure and a second lighting fixture for directing light toward said second row of stowage bins and wherein said first lighting fixture is positioned adjacent and above said second lighting fixture; said second illumination source comprising a third lighting fixture for directing light toward said ceiling structure and a fourth lighting fixture for directing light toward said first row of stowage bins and wherein said first lighting fixture is positioned adjacent and above said second lighting fixture; and further comprising a reflector member positioned adjacent said first illumination source, said reflector member adapted to control the light from a near-point source and direct light toward said stowage bins, thereby reducing glare and insuring the reflector is not visible to passengers and wherein said first lighting fixture and said third lighting fixture direct colored light toward said ceiling structure and wherein said second and fourth lighting fixture direct natural color or white light toward said second and first rows of stowage bins, respectively.

13. The illumination system as described in claim 12 wherein said airplane is a twin aisle airplane and two ceiling structures are provided, each of said ceiling structures having adjacent rows of stowage bins and illumination sources as set forth in claim 12.

14. An illumination system for cross-bin illumination of the ceiling structure of an airplane having a first row of stowage bins and a second row of stowage bins adjacent said ceiling structure, said cross-bin illumination system comprising: a first row of stowage bins and a second row of stowage bins adjacent a ceiling structure of an airplane and opposite the first row of stowage bins, said first and second rows of stowage bins positioned generally at the intersection of an aircraft sidewall and ceiling structure; a first illumination source adjacent said first row of stowage bins and a second illumination source adjacent said second row of stowage bins; said first illumination source comprising a first LED lighting fixture for directing light toward said ceiling structure and a second LED lighting fixture for directing light toward said second row of stowage bins; said second illumination source comprising a third LED lighting fixture for directing light toward said ceiling structure and a fourth LED lighting fixture for directing light toward said first row of stowage bins and further comprising a reflector member positioned adjacent said first illumination source adapted to control light from a near-point source and direct light toward said stowage bins thereby reducing glare and insuring the reflector is not visible to passengers and wherein said first lighting fixture and said third lighting fixture direct colored light toward said ceiling structure and wherein said second and fourth lighting fixture direct natural color or white light toward said second and first rows of stowage bins, respectively.

* * * * *